(12) United States Patent
Bayramoglu (10) Patent No.: US 7,593,005 B2
(45) Date of Patent: Sep. 22, 2009

(54) TOUCH DETECTION SYSTEM

(75) Inventor: Gokalp Bayramoglu, Pleasanton, CA (US)

(73) Assignee: AWR Consulting Inc., Pleasanton, CA (US)

( * ) Notice: Subject to any disclaimer, the term of this patent is extended or adjusted under 35 U.S.C. 154(b) by 282 days.

(21) Appl. No.: 11/592,872

(22) Filed: Nov. 6, 2006

(65) Prior Publication Data

US 2007/0132743 A1    Jun. 14, 2007

Related U.S. Application Data

(60) Provisional application No. 60/749,489, filed on Dec. 13, 2005.

(51) Int. Cl.
*G06F 3/043* (2006.01)
*G06F 3/041* (2006.01)

(52) U.S. Cl. .................. 345/177; 345/156; 345/173; 178/18.04

(58) Field of Classification Search .......... 345/173–181
See application file for complete search history.

(56) References Cited

U.S. PATENT DOCUMENTS

| | | | |
|---|---|---|---|
| 6,215,916 B1 * | 4/2001 | Acharya | 382/298 |
| 2004/0133366 A1 * | 7/2004 | Sullivan et al. | 702/56 |

* cited by examiner

*Primary Examiner*—Duc Q Dinh (57) ABSTRACT

A touch detection using wavelet algorithm for detecting touches on a surface by receiving acoustic waves generated by the touch and performing signal analysis on these acoustic waves using wavelet transformation where the storage requirement for reference signal is reduced. The inventive device includes a substrate that can be any material which is capable of propagating acoustic waves, transducers that detect the acoustic waves generated by the touch on the screen, a controller that implements the wavelet algorithm and software that incorporates wavelet algorithm. The substrate can be built from any material that is capable of propagating acoustic waves. The size of the substrate is not limited to a certain size. The sensitivity of the controller is determined and adjusted by the algorithm based on the size of the substrate. This is an adaptive sensitivity control determined by the size of the substrate. Transducers can be either piezo transducers or any other type that can detect acoustic waves generated by the touch on the substrate. The resonance frequency of these transducers can be within the sound frequency range. The sensitivity of the controller is determined based on the resonant frequency of these transducers used to detect acoustic waves. The controller is the device that accepts inputs from those transducers that are placed on the substrate. These signals are converted to digital signals by means of analog to digital converters on the controller board. These signals are applied to a microcontroller circuit on the controller. The microcontroller has a firmware code that is stored in the ROM area. This code implements the wavelet algorithm to characterize and detect the touch location. The location that is calculated by the controller is communicated to host computer. A driver that resides in the host computer receives the touch coordinate locations from the controller and communicates the location with the operating system. If the controller is not performing the wavelet algorithm then the software will be performing the wavelet algorithm.

7 Claims, 10 Drawing Sheets

FIG. 1

PRIOR ART

TOUCH DETECTION SYSTEM

This application claims the benefit of U.S. Provisional Application No. 60/749,489 filed Dec. 13, 2005.

BACKGROUND OF THE INVENTION

1. Field of the Invention

The present invention relates generally to a touch algorithm and more specifically it relates to a touch detection using wavelet algorithm to perform signal analysis on acoustic waves that are generated by a touch on a substrate that is capable of propagating acoustic waves.

2. Description of the Related Art

Touch screens have been in use for years. Typically, touch screens are comprised of resistive, infrared, surface acoustic wave, pressure and capacitive touch screens.

The main problem with conventional resistive touch screens is the durability. After certain period of usage, the screen may fail to register certain locations. The production of resistive touch screen requires numerous manufacturing steps which include but not limited to sputtering or printing conductive coating, adding a linearization pattern and adding a cover sheet. Both resistive and capacitive products tend to loose their linearization and calibration over time. These screens can be re-calibrated by the end user; however linearization is a function of the conductive pattern and cannot be adjusted by the end user.

Infrared screens use infrared transmitters and receivers. When the screen is touched, the light from transmitter to receiver is blocked and this blockage is detected by the touch detection algorithm. The increased power consumption by infrared screens make them less likely candidate for handheld and portable applications. The increased part count of an infrared screen may reduce its reliability compared to other technologies.

Capacitive screens tend to be affected by the environmental capacitance. Therefore a system level design has to be done very carefully to make sure that not many metal objects are around the screen. This of course, increases the design and product cost. Another problem with conventional touch screens is the power consumption.

A surface acoustic screen uses more power than resistive and capacitive screens due to the fact that transmitters are always emitting acoustic waves. These screens cannot be used in handheld and portable applications due to the impact of power consumption on battery life.

recently, there are new acoustic technologies that are being developed by different companies. NXT has an acoustic wave technology that detects the "time of flight" of acoustic waves when the screen is touched. However, reflecting waves from boundaries on the screen create issue which requires absorbing material to be placed on the edges of the screen to dampen the reflective waves. This step increases manufacturing complexity. Furthermore, the signal processing unit has to be powerful enough to carry out the signal processing task which may increase the design and product cost.

A similar technology developed by Intelligent Vibrations detects the "time of flight" by using acoustic waves that are generated by a touch on the screen. This technology uses two sensors that are placed both sides of the substrate. The technology is not very sensitive to light touches. The signal processing is performed on a controller board that requires high processing power which increases the product cost.

Soundtouch Technology has an approach to characterize the screen that calculates phase differences of each point to detect the touch. The major issue with this approach is that it requires excessive amount of storage area to store the characterized data. This increases the cost of the product.

Another company called Sensitive-Object has a similar approach that characterizes the screen and stores the characterized data in the memory. Its shortcomings are the same as Soundtouch technology.

U.S. Pat. No. 5,465,302 teaches how to use an array of microphones to detect a signal coming from a speaker location. Signals detected by microphones are transformed by using Fast Fourier Transformation and the phase differences are extracted. These phase differences are used to determine the location of the speaker.

U.S. Pat. No. 6,922,642 teaches how to generate acoustic waves on a surface that is capable of transmitting acoustic waves. Furthermore, this patent teaches how to generate dispersion corrected convolution function, dispersion corrected correlation function and other phase equivalent functions to determine information related to contact on the surface.

U.S. Pat. No. 6,871,149 teaches how to use phase differences in detected signals to determine the touch location on a given surface. At least two pairs of transducers are required to detect acoustic waves generated on a surface. These signals are processed to determine the phase and then phase differences between the signals are used to determine the touch location.

WO 00/38104 World Patent Application teaches how to detect the position of a touch on a large surface. The application discusses how acoustic waves can be generated either by using a hard object or finger (either nail or skin of the finger) and then how these acoustic waves are analyzed to determine the touch location.

US Patent Application 2005/0083313 teaches how to detect the location of a touch by using phase information. This technique uses devices that can transform mechanical energy to electrical energy also known as "transducers". Phase of the arriving signal for right and left channels are determined and then the differences between these phases are calculated and stored in a memory. When the surface is touched, phase differences between the right and the left channels are calculated and compared with the phase differences stored in the memory.

US Patent Application 2005/02127777 teaches how to characterize a surface and store the characterized data in memory. Different techniques are disclosed including how to compare measured phase differences with stored phase differences to detect the touch location.

WO0148684 teaches how to detect acoustic waves on a given surface and how to use the measured data to construct a non-dispersive signal to determine the touch location.

U.S. Pat. No. 6,456,952 teaches how to characterize a touch screen to prevent drifting.

U.S. Pat. No. 6,977,646 discloses how to do a calibration for a touch screen.

U.S. Pat. No. 5,751,276 teaches how to perform calibration on a touch screen and how to save those numbers in memory location to be used later.

U.S. Pat. No. 6,353,434 teaches how to perform calibration on a touch screen and how to store calibration data in a memory location to be used later.

U.S. Pat. No. 6,650,319 discloses complete mapping and screen characterization.

These prior art patents and patent applications reveal the fact that there is well established prior art to characterize a touch surface and store characterized information in a storage element. The stored data is compared with real time data to determine the touch location. This is pretty much the common scheme among several patents and patent applications. The amount of data storage increases as the screen size increases. In certain cases, the amount of data may be a prohibiting factor for product implementation and in other cases, it increases the product cost. Therefore the ability of using a new technique to reduce the amount of data to be stored is highly desired.

In these respects, the touch detection using wavelet algorithm according to the present invention substantially departs from the conventional concepts and designs of the prior art, and in so doing provides an apparatus primarily developed for the purpose of detection of a touch on a given surface by receiving acoustic waves generated by a touch and performing signal analysis on these acoustic waves using wavelet transformation such that data storage requirement is substantially reduced.

SUMMARY OF THE INVENTION

In view of the foregoing disadvantages inherent in the known types of touch screens now present in the prior art, the present invention provides a new touch detection using wavelet algorithm wherein the same can be utilized for detection of a touch on a given surface by receiving acoustic waves generated by a touch and performing signal analysis on these acoustic waves using wavelet transformation that utilizes only certain number of wavelet coefficients.

The general purpose of the present invention, which will be described subsequently in greater detail, is to provide a new touch detection using wavelet algorithm which uses only small number of wavelet coefficients that has many of the advantages of the wavelet touch algorithm mentioned heretofore and many novel features that result in a new touch detection using wavelet algorithm which is not anticipated, rendered obvious, suggested, or even implied by any of the prior art touch screens, either alone or in any combination thereof.

To attain this, the present invention generally comprises a substrate that can be any material which is capable of propagating acoustic waves, transducers that detect the acoustic waves generated by the touch on the screen, a controller that implements the wavelet algorithm and a software that incorporates wavelet algorithm. The substrate can be built from any material that is capable of propagating acoustic waves. The size of the substrate is not limited to a particular size. The sensitivity of the controller is determined and adjusted by the algorithm which is based on the size of the substrate. This is an adaptive sensitivity control determined by the size of the substrate. Transducers can be either piezo transducers or any other type that can detect acoustic waves generated by the touch on the substrate. The resonance frequency of these transducers can be within the sound frequency range. The sensitivity of the controller is determined based on the resonant frequency of these transducers used to detect acoustic waves. The controller is the device that accepts inputs from those transducers that are placed on the substrate. These signals are converted to digital signals by means of analog to digital converters on the controller board. Digital signals are applied to a microcontroller circuit on the controller. The microcontroller has a firmware code that is stored in the ROM area. This code implements the wavelet algorithm to characterize and detect the touch location. The location that is calculated by the controller is communicated to host computer. A driver that resides in the host computer receives the touch coordinate locations from the controller and communicates the location with the operating system. If the controller is not performing the wavelet algorithm then the software will be performing the wavelet algorithm. At any given time and in a given system, software is capable of detecting if the controller is capable of performing wavelet algorithm to detect the touch location or not. This is the wavelet algorithm that calculates wavelet coefficients and uses those wavelet coefficients to determine the touch location.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a touch detection using wavelet algorithm that will overcome the shortcomings of the prior art devices.

An object of the present invention is to provide a touch detection using wavelet algorithm for detection of a touch on a given surface by listening to acoustic waves generated by the touch and performing signal analysis on these acoustic waves using wavelet transformation.

Another object is to provide a touch detection using wavelet algorithm that overcomes the shortcomings of the existing touch technologies by providing a touch screen that does not require linearization by the customer.

Another object is to provide a touch detection using wavelet algorithm that is passive and does not use as much power as the existing products in the market.

Another object is to provide a touch detection using wavelet algorithm that uses the acoustic wave technology to detect the location of the touch by characterizing each point and comparing the data of the touch with the characterized data.

Another object is to provide a touch detection using wavelet algorithm that utilizes wavelet transform to generate approximation and detail coefficients and store them in a memory so that they can be compared with a touch data to determine the touch location.

Another object is to provide a touch detection using wavelet algorithm that does not require as much storage space as the prior art proposed devices.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Turning now descriptively to the drawings, in which similar reference characters denote similar elements throughout the several views, the attached figures illustrate a touch detection using wavelet algorithm, which comprises a substrate that can be any material which is capable of propagating acoustic waves, transducers that detect the acoustic waves generated by the touch on the screen, a controller that implements the wavelet algorithm and a software that incorporates wavelet algorithm. The substrate can be built from any material that is capable of propagating acoustic waves. The size of the substrate is not limited to a certain size. The sensitivity of the controller is determined and adjusted by the algorithm based on the size of the substrate. This is an adaptive sensitivity control determined by the size of the substrate. Transducers can be either piezo transducers or any other type that can detect acoustic waves generated by the touch on the substrate. The resonance frequency of these transducers can be within the sound frequency range. The sensitivity of the controller is determined based on the resonant frequency of these transducers used to detect acoustic waves. The controller is the device that accepts inputs from those transducers that are placed on the substrate. These signals are converted to digital signals by means of analog to digital converters on the controller board. These signals are applied to a microcontroller circuit on the controller. The microcontroller has a firmware code that is stored in the ROM area. This code implements the wavelet algorithm to characterize and detect the touch location. The location that is calculated by the controller is communicated to host computer. A driver that resides in the host computer receives the touch coordinate locations from the controller and communicates the location with the operating system. If the controller is not performing the wavelet algorithm then the software will be performing the wavelet algorithm. At any given time and in a given system, software is capable of detecting if the controller is capable of performing wavelet algorithm to detect the touch location or not. This is the wavelet algorithm that calculates wavelet coefficients and uses those wavelet coefficients to determine the touch location.

The substrate can be built from any material that is capable of propagating acoustic waves. The size of the substrate is not limited to any size. The sensitivity of the controller is determined and adjusted by the algorithm based on the size of the substrate. This is an adaptive sensitivity control determined by the size of the substrate. The substrate is made of any material that can propagate acoustic waves without introducing great amount of attenuation. A glass is a good candidate for a substrate as it can propagate acoustic waves without much attenuation. Some applications require substrate to be transparent. One of those applications is where the substrate is placed in front of a display device to provide input to the host computer. In those applications it is required that substrate has a good light transmission characteristics. In other applications, the light transmission characteristics of the substrate is not that important. In those situations a substrate that is not transparent can be used. A substrate can be transparent or non-transparent. Some applications require transparent substrates and some others require non-transparent substrate. The substrate size can vary based on the application. When the substrate area is small, the attenuation of acoustic waves is less than when the substrate area is larger. A circuit detects this and adjusts the sensitivity of the controller circuit to compensate for the increased attenuation due to increased size. Substrate has to be built using a material that can propagate acoustic waves without too much attenuation.

Transducers can be either piezo transducers or any other type that can detect acoustic waves generated by the touch on the substrate. The resonance frequency of these transducers can be within the sound frequency range. The sensitivity of the controller is determined based on the resonant frequency of these transducers used to detect acoustic waves. Transducers are commercially available piezoelectric transducers that detect the acoustic wave vibrations on the substrate. Transducers can be either circular bender type or rectangular transducers. These transducer are attached to the bottom side of the substrate using glues.

The controller is the device that accepts inputs from those transducers that are placed on the substrate. These signals are converted to digital signals by means of analog to digital converters on the controller board. These signals are applied to a microcontroller circuit on the controller. The microcontroller has a firmware code that is stored in the ROM area. This code implements the wavelet algorithm to characterize and detect the touch location. The location that is calculated by the controller is communicated to host computer. The controller consists of an analog to digital converter, storage unit, microcontroller to carry out the algorithm, communication circuit and other electrical components required for the circuit operation. The analog to digital converter accepts the analog signal from the screen and converts it to digital information. This digital information is sent to microcontroller unit for mathematical calculations. The results of the calculation are stored in the storage unit. When the screen is being characterized, the analog signal comes to controller from the screen. This signal is digitized by the analog to digital converter and then applied to microcontroller unit. Microcontroller unit on the controller calculates wavelet coefficients for the digital signal. These coefficients then stored in the storage unit. During normal operation of the screen, when the screen is touched by either finger or any other object, the analog signal that is detected by the transducers is communicated to the controller. The analog to digital converter on the controller converts the analog signal to digital signal. Then this digital signal is applied to microcontroller unit. The microcontroller unit calculates the wavelet coefficients and compares these coefficients with the coefficients stored in the storage unit. Based on the correlation between the two sets of coefficients, the touch location is determined and reported to communication unit. The communication unit uses any standard communication protocol that communicates with the host computer. The controller can be built either to be used with a large system or smaller system. When used with a large system, any standard communication protocol that the host computer is capable of can be used. These protocols include but not limited to serial data interface, Universal Serial Bus interface and others. If the controller is used in a smaller system such as a handheld computer or a PDA or an MP3 player or any other portable computer or portable entertainment device, then any communication protocol that the portable device is capable of supporting can be used by the controller. The controller can have any controller chip that is capable of performing the proposed algorithm. The analog to digital converter can be any converter that can accept analog signals and generate digital output that is applied to microcontroller unit.

A driver that resides in the host computer receives the touch coordinate locations from the controller and communicates the location to the operating system. If the controller is not performing the wavelet algorithm then the software will be performing the wavelet algorithm. At any given time and in a given system, software is capable of detecting if the controller is capable of performing wavelet algorithm to detect the touch location or not. The software is a component of the system that resides on the host computer. The software provides communication with the controller and with the host computer operating system. The software component has two ways of communications with both the controller and the host system. The software can be written by using any software programming language. These include but not limited to C++, FORTRAN, C and others. Software can perform the wavelet algorithm if it is not done in the controller. Alternatively, software can only communicate the coordinates of the touch to the host computer. Software can communicate with any operating system that is used on the host computer. This includes but not limited to Windows operating system and Windows CE.

This is the wavelet algorithm that calculates wavelet coefficients and uses those wavelet coefficients to determine the touch location. Algorithm is the component where the wavelet transformation is implemented. This is either accomplished in the controller or in the software as described previously. The algorithm accepts digital numbers that represent the signal coming from the screen. A Wavelet transform is applied to this signal. During the characterization phase of the screen, wavelet coefficients are calculated and stored in the storage unit. During the regular operation, the digitized numbers are applied to algorithm and the algorithm calculates the wavelet coefficients. The algorithm reads the stored coefficients and a comparison was done. Based on the results of the comparison, the touch location is determined. Algorithm can be implemented in software using any software language. Alternatively the algorithm can be implemented in the controller as a firmware. Again, any programming language can be used to implement the algorithm in the controller. The algorithm can also be incorporated into an application specific integrated circuit such that all the calculations are performed inside the application specific integrated circuit in terms of hardware calculations. A DSP processor can also be used to perform the algorithm.

Figure 1:
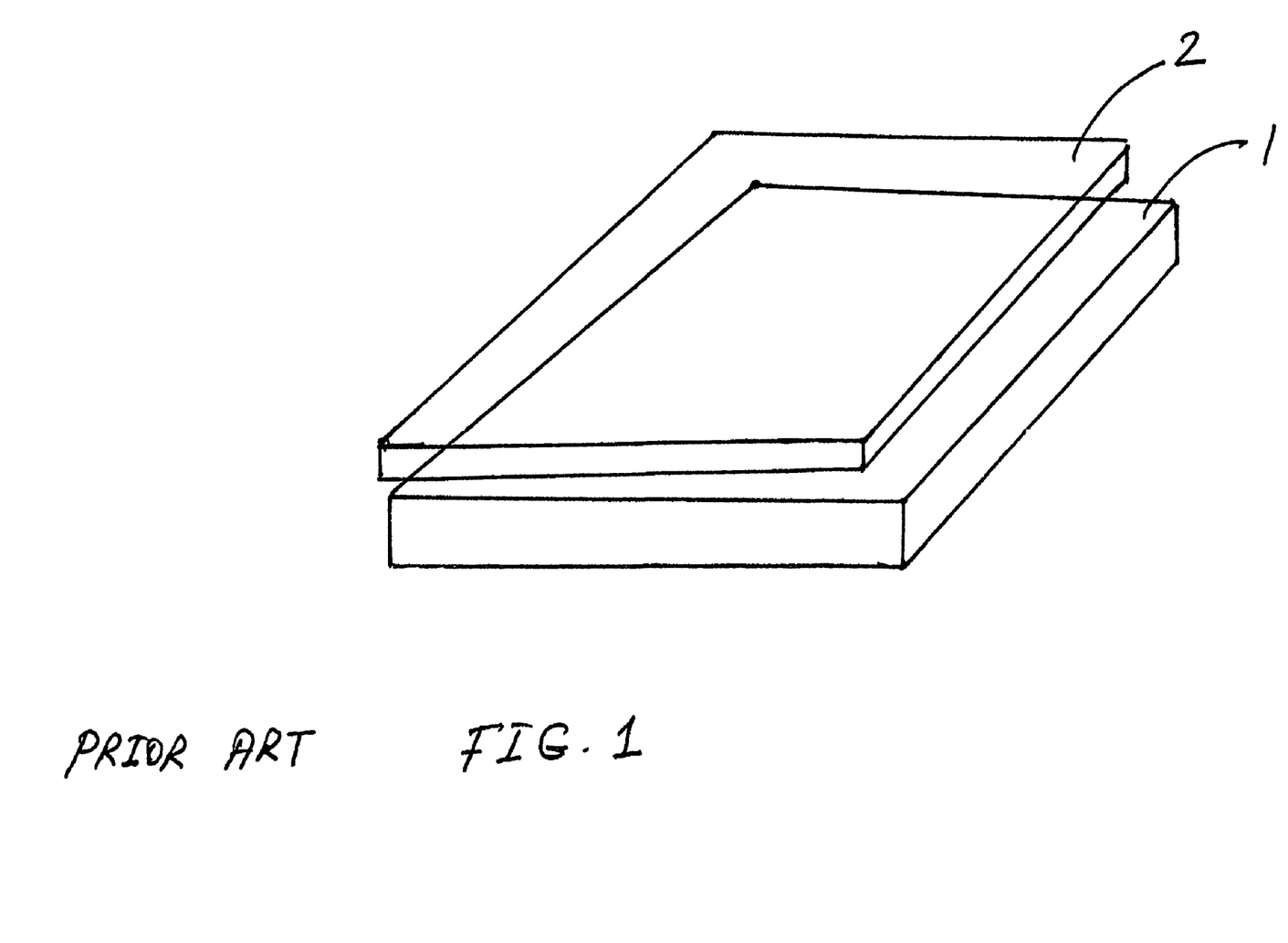
FIG. 1 is Prior Art.
Figure 2:
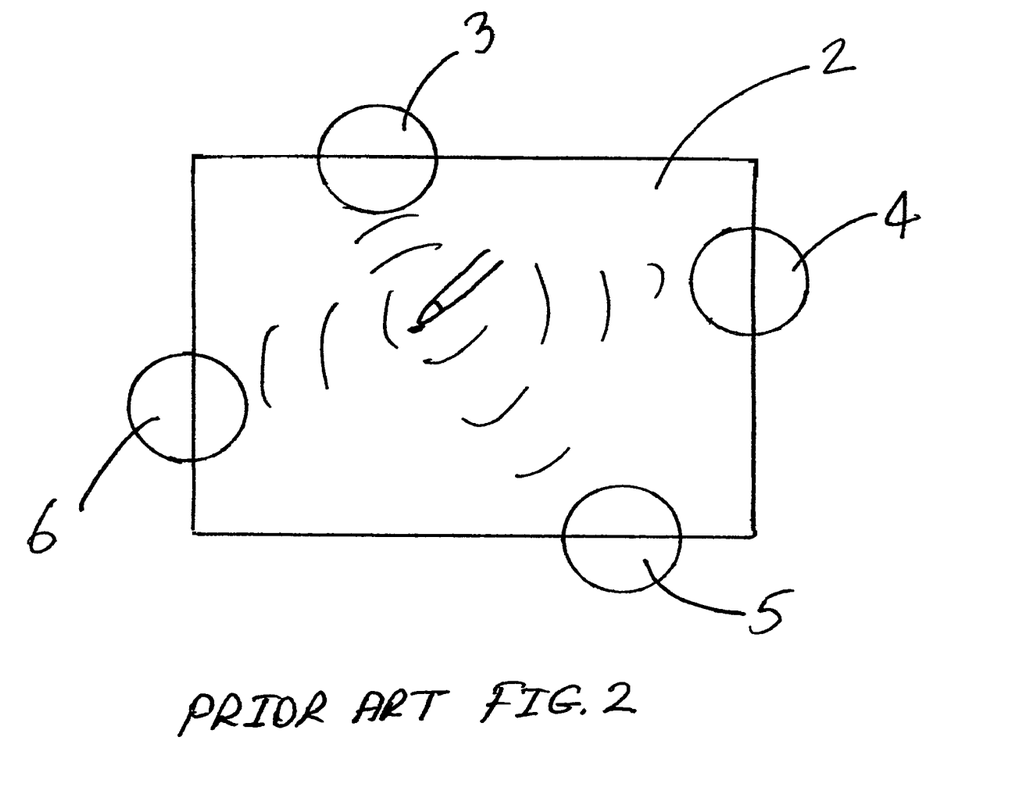
FIG. 2 is Prior art of a Screen.
Figure 3:
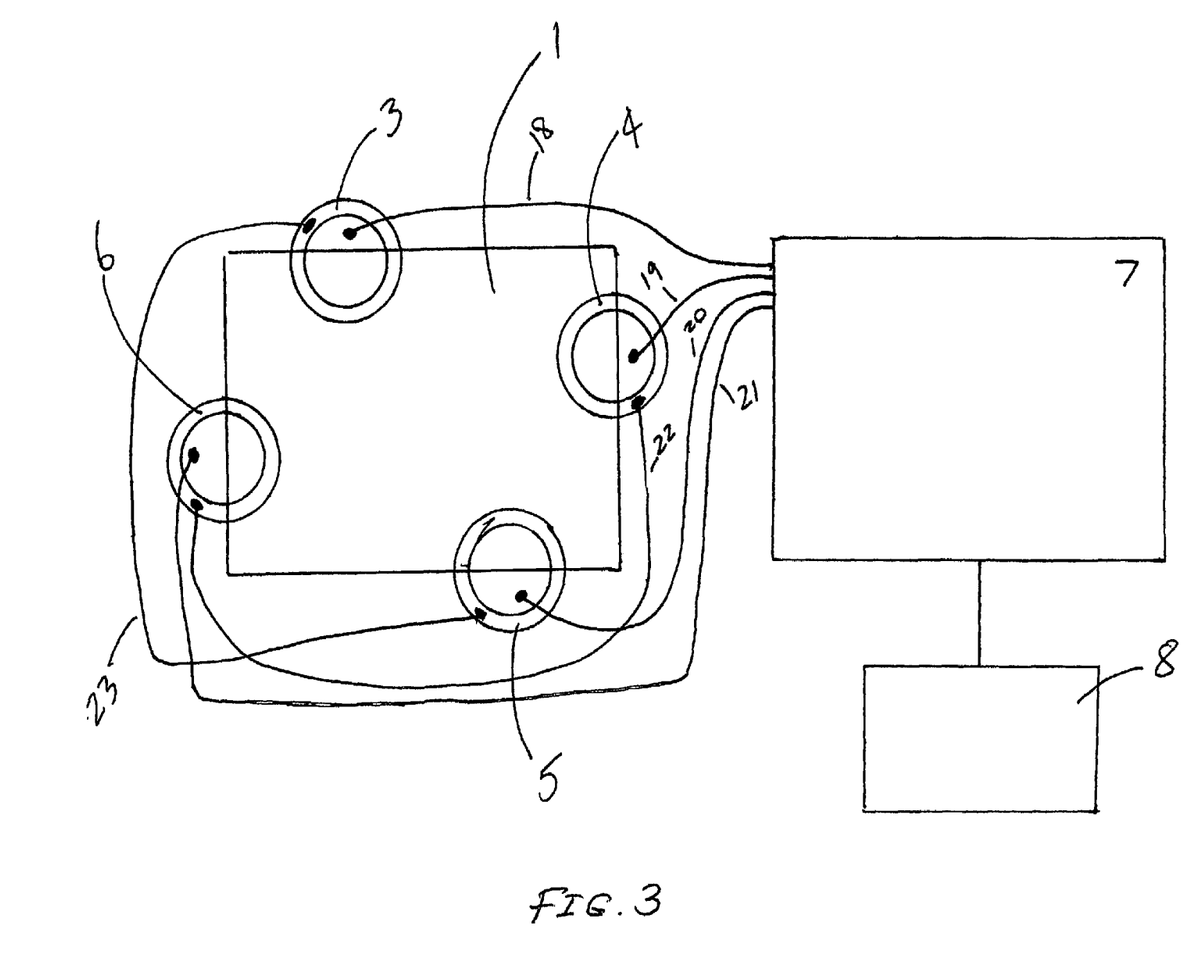
FIG. 3 is Perspective view of the invention.
Figure 4:
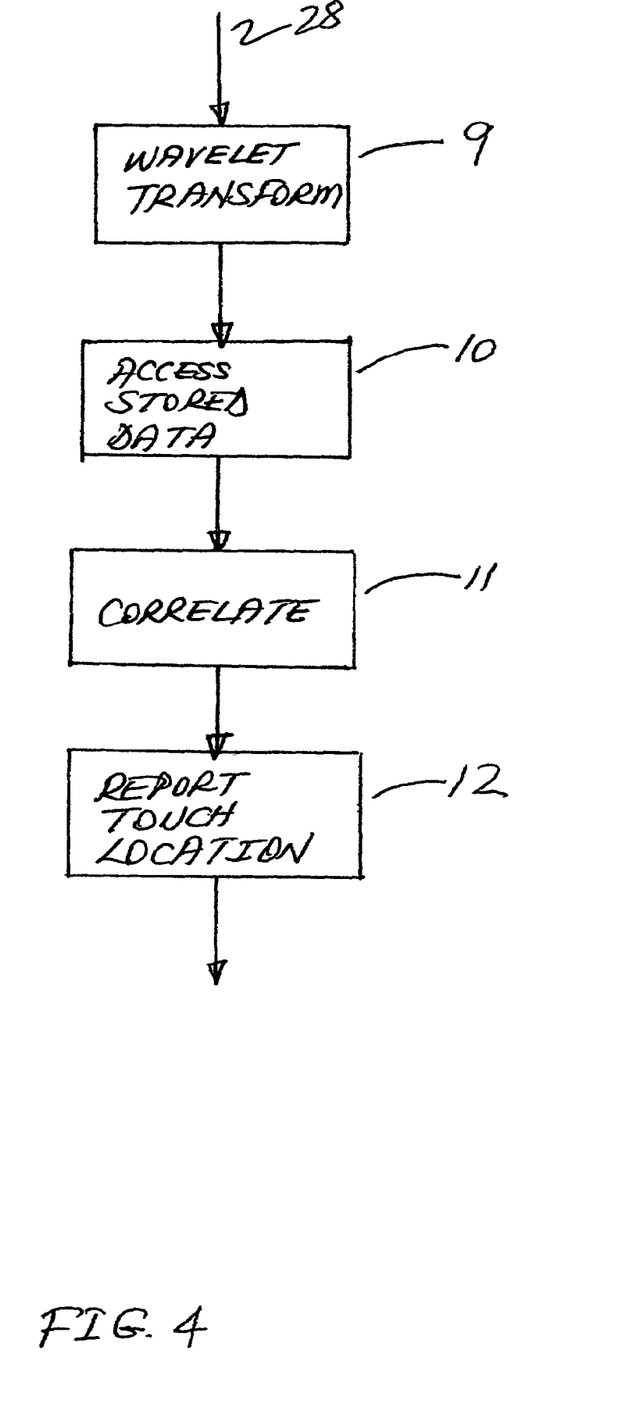
FIG. 4 is Characterization Algorithm.

The touch screen 2 is placed on top of another substrate 1 as shown in FIG. 1. Four transducers are placed at the bottom of the screen as shown in FIG. 2. Transducers are placed on the substrate in an asymmetric configuration. FIG. 3 shows the connections between the transducers and the controller and the host system. Transducers 3 and 5 paired together by using wire 23 while transducers 4 and 6 are paired together. One terminal of transducer 3 is connected to the similar terminal of the transducer 5 by using wire 23. The other terminal of the transducer 5 is connected to controller 7 as one of the input channels. This connection is accomplished via wire 20. The other terminal of the transducer 3 is also connected to the controller 7 and tied to the ground connection via wire 18. Transducer 3 and transducer 5 connections can be swapped i.e. the other terminal of the transducer 5 can be connected to wire 18 while the other terminal of the transducer 3 can be connected to wire 20. The transducer 6 and the transducer 4 are connected to each other using the wire 22. The other terminal of the transducer 6 is connected to the controller input via the wire 21. Transducer 4 is also connected to the controller 7 input via the wire 19. The wire 19 is connected to the ground in the controller 7. These connections can be swapped as described above. For example, the terminal of the transducer 6 can be connected to the wire 19 while the terminal of the transducer 4 can be connected to the wire 22. Controller 7 output is connected to the host system 8.

Figure 5:
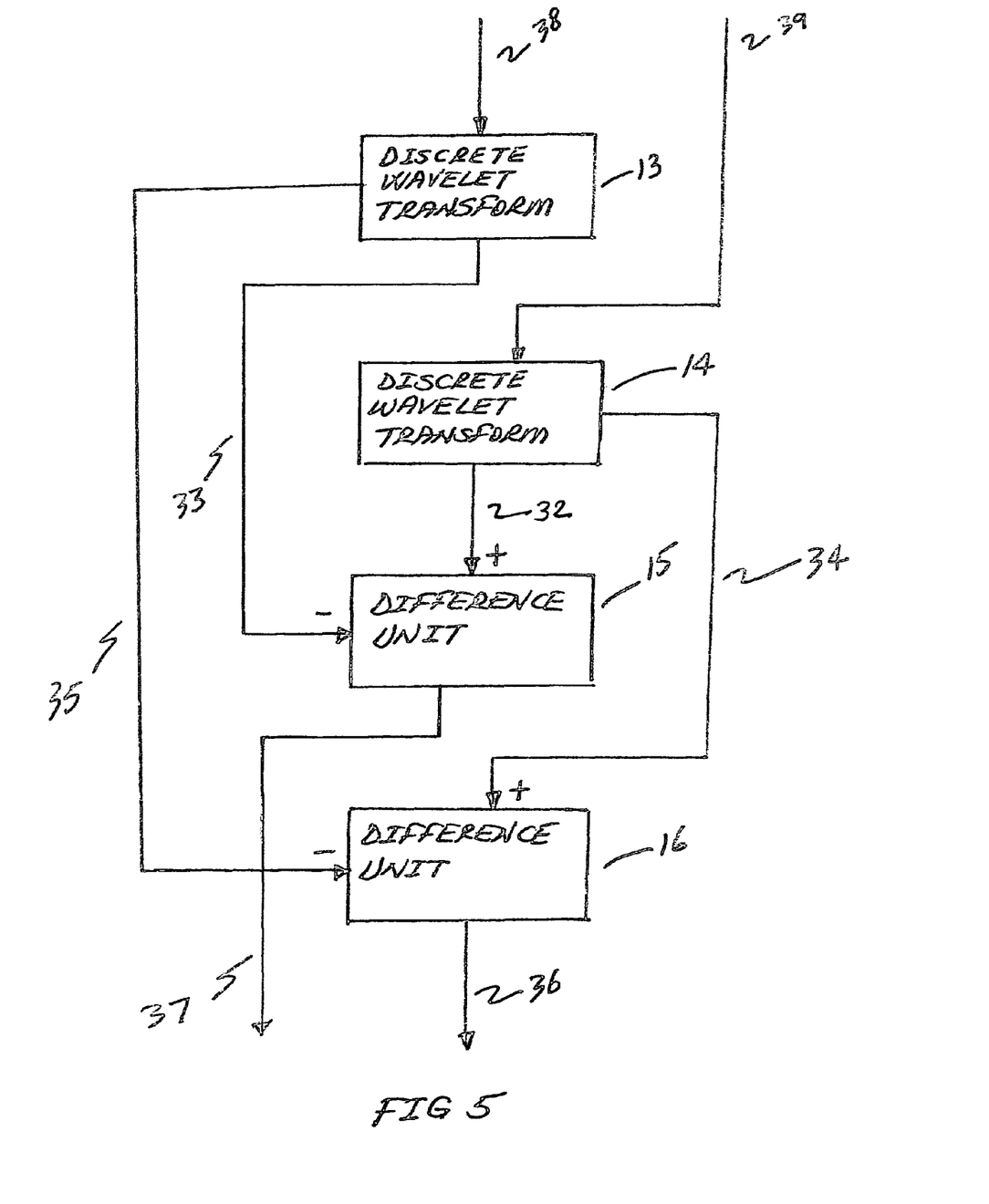
FIG. 5 is Detection Algorithm.
Figure 6:
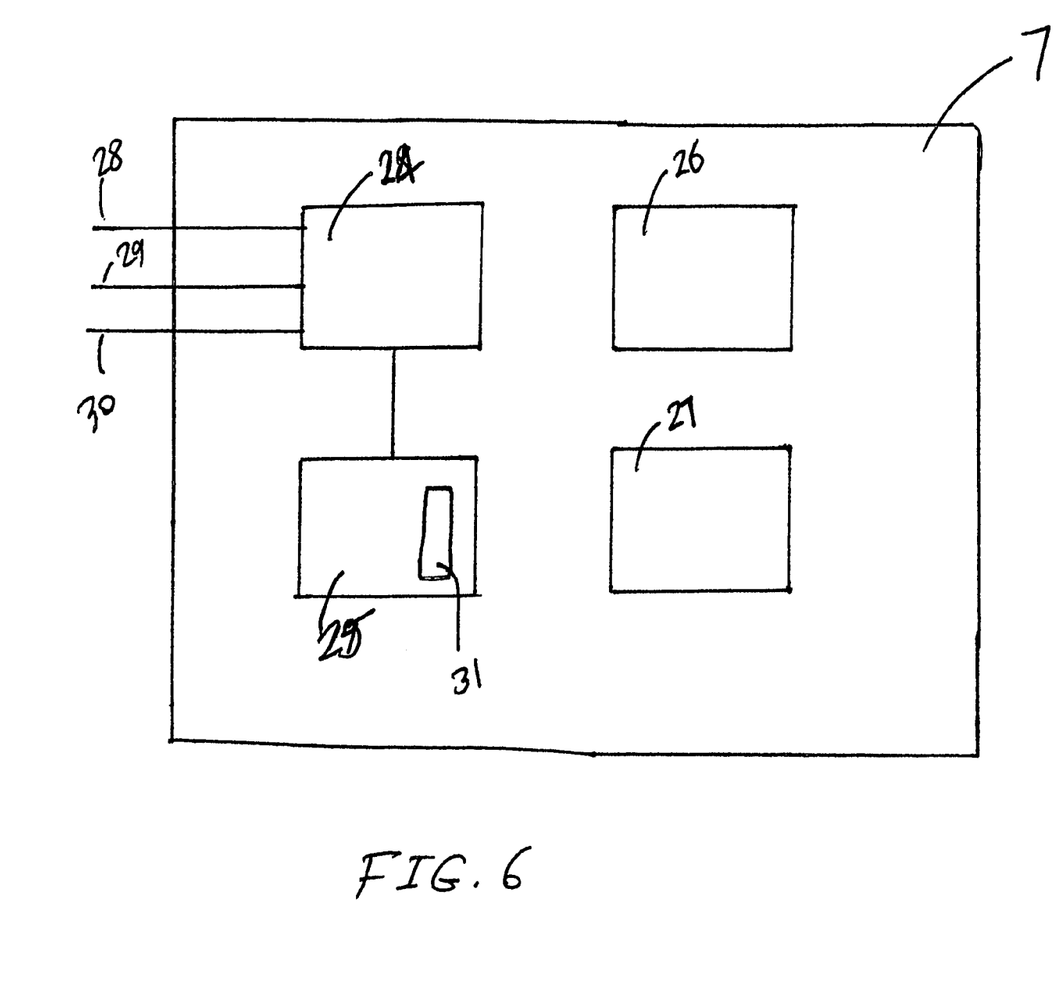
FIG. 6 is Controller.
Figure 7:
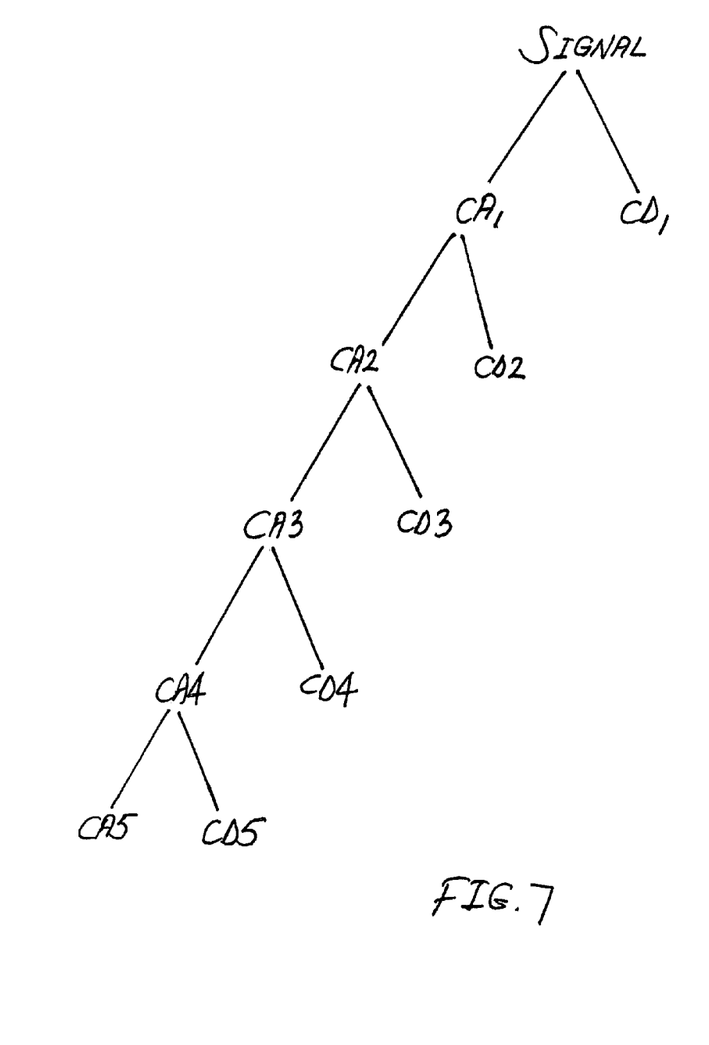
FIG. 7 is Wavelet Coefficients.
Figure 8:
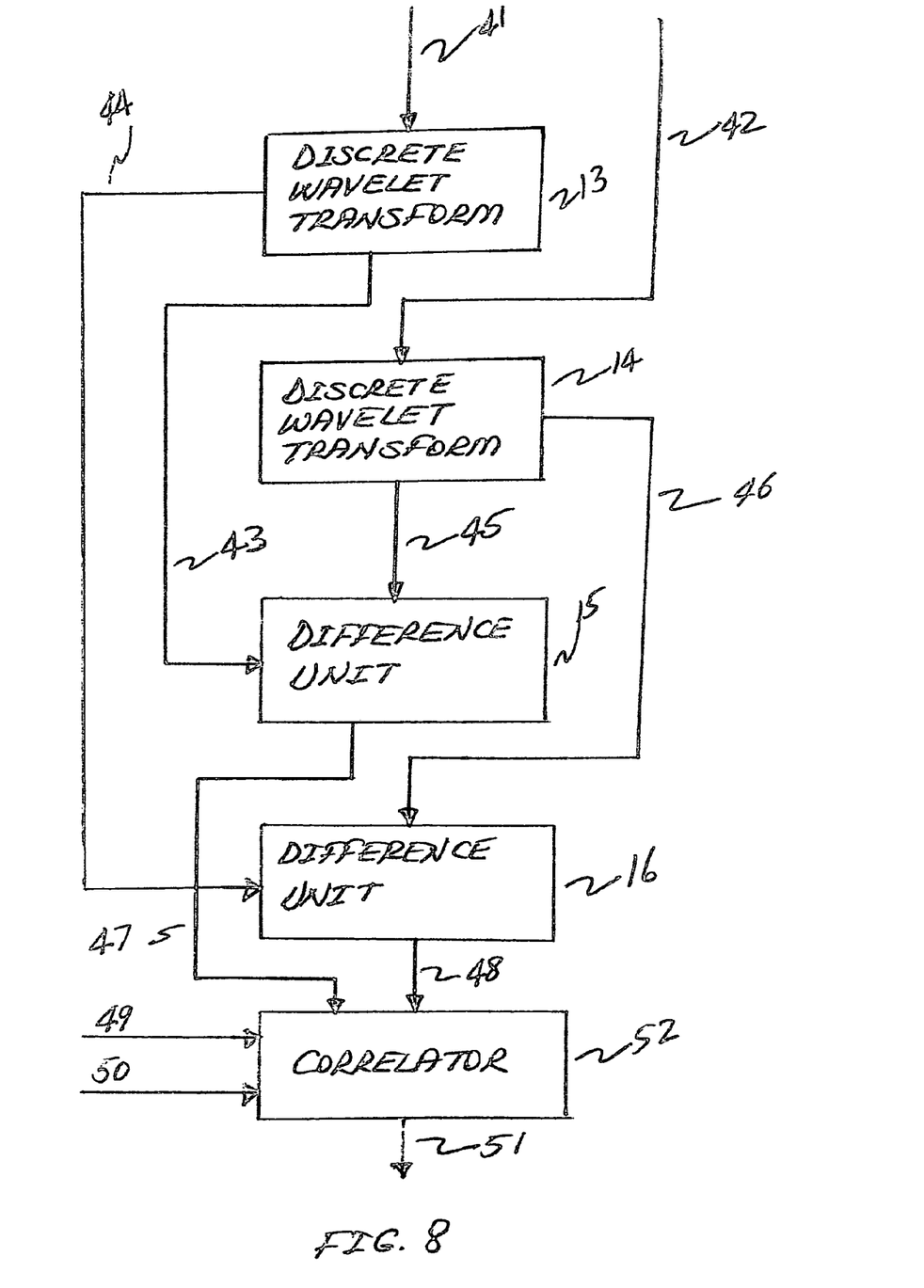
FIG. 8 is Detection Algorithm.
Figure 9:
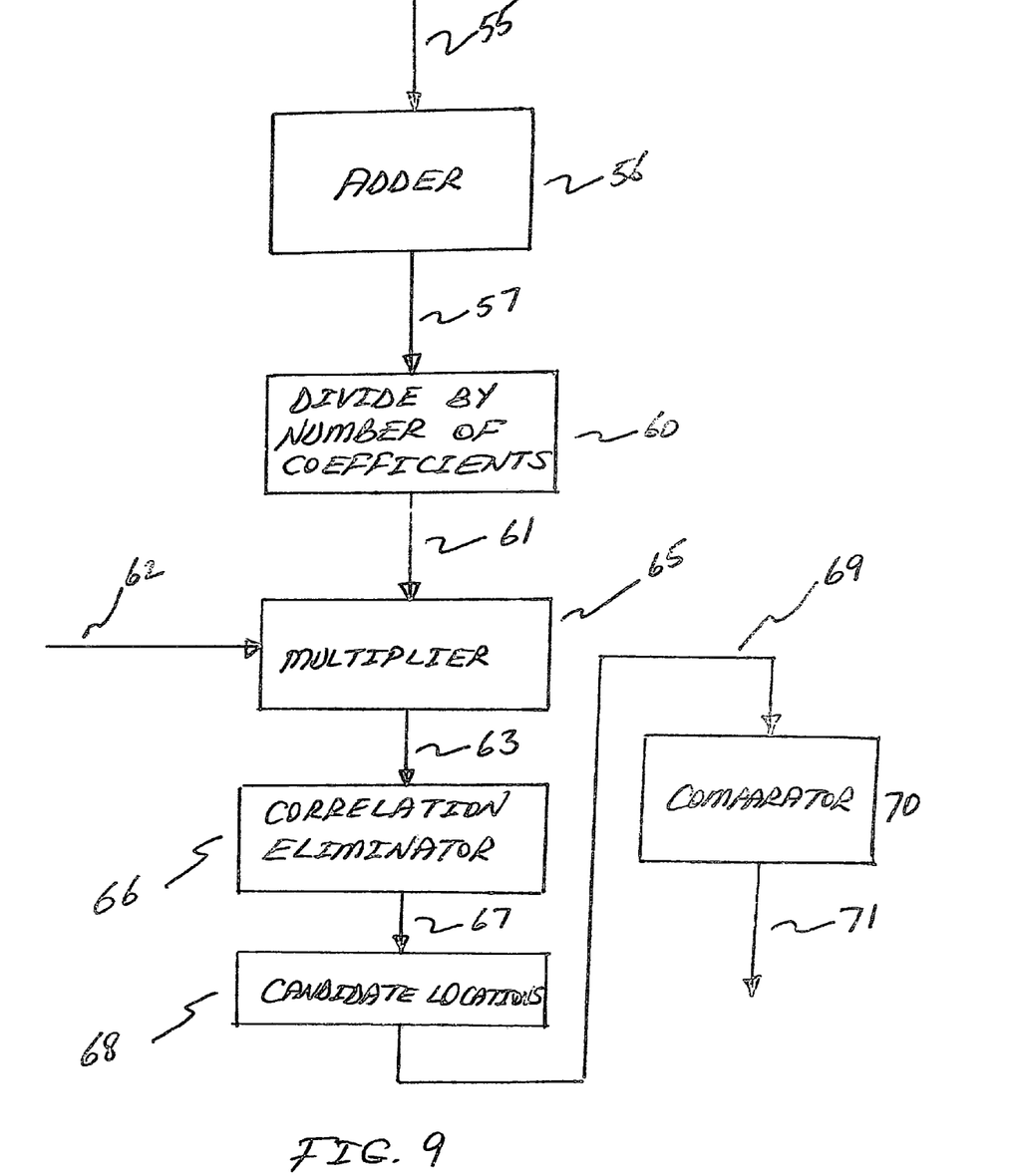
FIG. 9 is Detection Algorithm.
Figure 10:
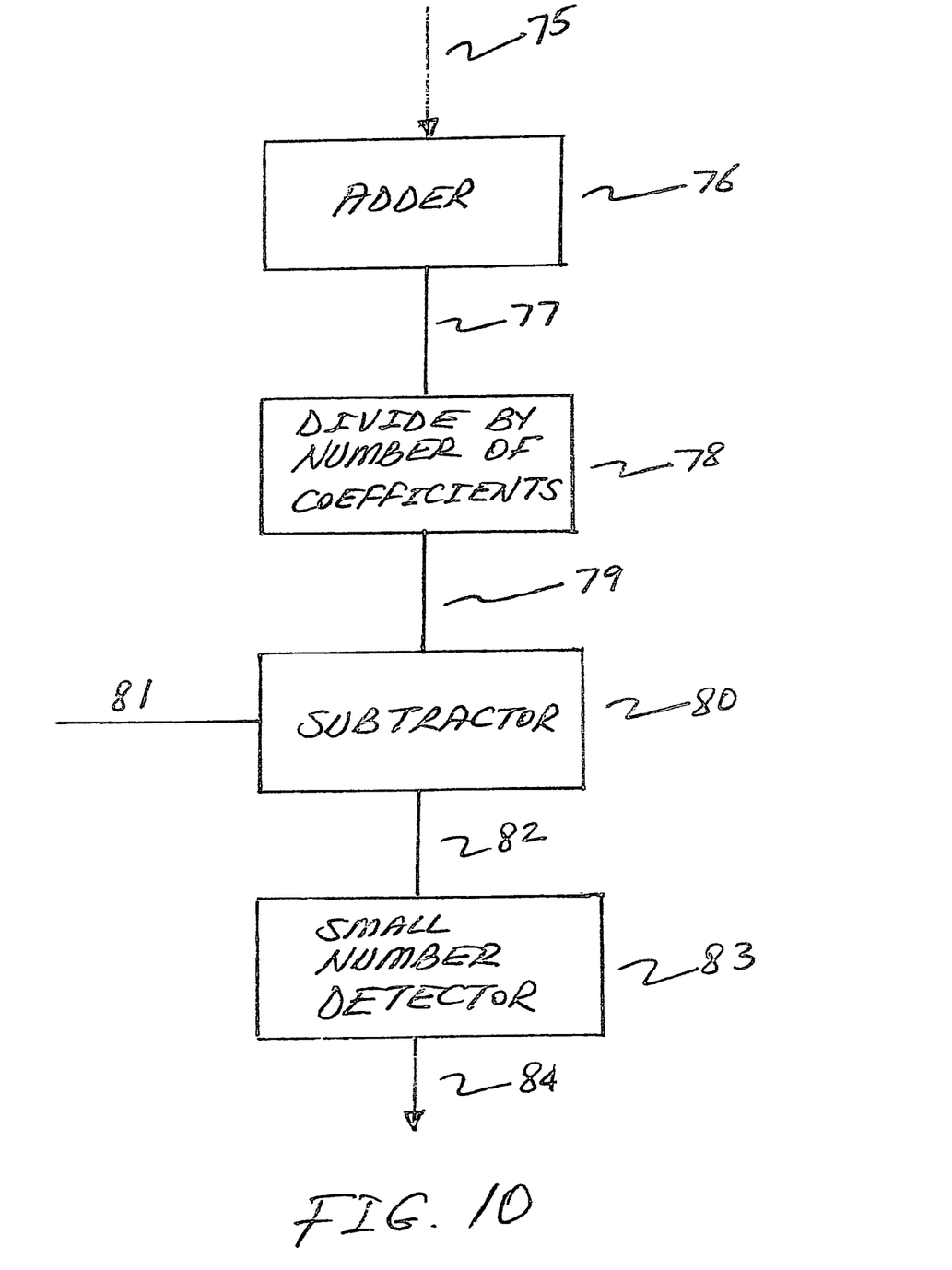
FIG. 10 is Detection Algorithm.

FIG. 1 shows the substrate 2 and how it is placed on top of the surface 1. FIG. 2 shows the substrate 2 and the transducers placed on the substrate 2. Transducers 3, 4, 5 and 6 can be any transducers that are able to detect acoustic waves. They can be attached to substrate 2 either at the top side or the bottom side. In either case, they have to be attached to the substrate to detect the vibration of the substrate that is generated by the acoustic waves. Among many other possible attachments, glue is used to accomplish this task. Acoustic waves are generated as a result of a touch on the substrate either by using one's finger or using any subject that would generate acoustic waves. Transducer connections are shown in FIG. 3. Transducers are placed on the substrate in an asymmetric configuration. Each transducer has two terminals. One terminal is common and the other terminal is the signal terminal. Transducer 3 and transducer 5 common terminals are tied together via the wire 23. Likewise, transducer 6 and transducer 4 common terminals are tied together via the wire 22. Other terminal of transducer 3 is connected to the controller 7 via the wire 18. The other terminal of the transducer 5 is connected to the controller via the wire 21. The other terminal of the transducer 6 is connected to the controller 7 via the wire 21. The other terminal of the transducer 4 is connected to the controller 7 via the wire 19. The controller 7 consists of many sub components as depicted in FIG. 6. An analog to digital conversion unit (A/D) 24 accepts the inputs from the transducers. There are three inputs to A/D unit 24. The right channel 28, the left channel 29 and the common signal 30. These signals come from the transducers and they are digitized by the A/D unit 24. This unit can be any A/D unit that can perform analog to digital conversion. The A/D unit can in fact be part of the DSP unit. The output of the A/D unit 24 is applied to the microcontroller unit 25. The microcontroller unit 25 performs the wavelet algorithm on the digital signal. There are two distinct operations. During the characterization phase, a touch on the substrate 2 generates acoustic waves. These waves are detected by the transducers 3, 4, 5 and 6. The analog signal from these transducers 3, 4, 5, and 6 are applied to A/D unit 24 in the controller 7. After the signal converted to digital signal from the analog signal by the A/D unit 24, it is applied to microcontroller unit 25. The microcontroller unit 25 calculates the wavelet coefficients of this signal as described below. Alternatively, Digital Signal Processing unit 26 can be used to perform the wavelet and other digital signal processing calculations. In this case Digital Signal Processing unit 26 works closely with the microcontroller unit 25 to accomplish the Wavelet transformation and further calculations. Automatic gain control unit 27 controls the gain of the preamplifier 24 so that the circuit does not get overloaded when the screen 2 is touched hard. Several level of wavelet transform coefficient calculation is performed in the algorithm 31 that resides in the microcontroller 25. FIG. 5 shows the detail of the algorithm for screen characterization. Here, the signal 38 and the signal 39 are the outputs of the A/D unit 24. The signal 38 is applied to a discrete wavelet transform unit 13. The signal 39 is applied to discrete wavelet transform unit 14. Both units 13 and 14 calculate the discrete wavelet transform of the incoming digital signals. Here, five level wavelet decomposition is used. However, the decomposition does not have to be five levels and any level decomposition can be used to find wavelet coefficients. Five levels wavelet decomposition produces five approximation coefficients and five detail coefficients as depicted in FIG. 7. CA1 through CA5 are five levels of approximation coefficients. CD1 through CD5 are five levels of detail coefficients. The approximation coefficients of a wavelet transform helps to identify the similarities between two signals. The detail coefficients provide detail information about the signal and any sudden changes in the signal are identified by the detail coefficients. Wavelet coefficients are used in many other applications such as image processing. One of the most useful feature of the wavelet transform is that at any given level it is possible to use few coefficients to represent the original signal. This enables one to use wavelet transform for data compression applications. Here, limited number of coefficients are used at each stage to reduce the data storage requirement. Different number of coefficients are tried. For example in one case 32 coefficients are used for each stage. In another case 128 coefficients are used at each stage. Also, 16 coefficients are used in each stage. Returning back to FIG. 5, signal 38 is applied to Discrete Wavelet Transform unit 13 which calculates approximation coefficients 33 and detail coefficients 35 of the input signal 38. The Discrete Wavelet Transform unit 14 calculates the wavelet approximation coefficients 32 and detail coefficients 34 of the input signal 39. The approximation coefficients of input signal 38 and the approximation coefficients of signal 39 are applied to Difference Unit 15 which finds the difference between the two approximation coefficients. The detail coefficients 35 of the input signal 38 and the detail coefficients 34 of the input signal 39 are applied to the input of the Difference Unit 16 which calculates the difference between the detail coefficients 35 and the detail coefficients 34. The output 37 of the Difference Unit 15 and the output 36 of the Difference Unit 16 are applied to the storage unit. This way all the coefficients for characterized points are stored in the storage unit. We now turn to FIG. 8 to describe the operation of the screen to detect real time touches. When the screen 2 in FIG. 2 is touched by either finger or another object, acoustic waves are generated and these waves are detected by the transducers 3, 4, 5 and 6 that are located on the substrate 2. Signals 28, 29 and 30 from transducers 3, 4, 5 and 6 are applied to controller unit 7. The controller unit 7 has an amplifier and analog to digital converter (A/D) 24 in it. The outputs of the A/D unit 24 are digital signals 41 and 42 and they are applied to Discrete Wavelet Transform units 13 and 14. Discrete Wavelet Transform units 13 and 14 calculate the approximation and detail wavelet coefficients of the input signal. The approximation coefficients 44 and the detail coefficients 43 for the input signal 41 are calculated by the Discrete Wavelet Transform unit 13. The approximation coefficients 46 and the detail coefficients 45 of the input signal 42 are calculated by the Discrete Wavelet Transform unit 14. Wavelet transform units 13 and 14 can be both analog and digital wavelet transform units. The approximation coefficients 44 of the input signal 41 and the approximation coefficients 46 of the input signal 42 are applied to the Difference Unit 16 to find the difference between these coefficients. The detail coefficients 43 of the input signal 41 and the detail coefficients 45 of the input signal 42 are applied to the input of the difference unit 15 which finds the difference between the two coefficients. The output 47 of the difference unit 15 and the output 48 of the difference unit 16 are applied to the correlation unit 52. The other inputs 49 and 50 of the correlation unit 52 come from the storage unit. Coefficients 49 and 50 are stored in the storage unit during the characterization phase as described above. The output of the correlation unit 51 is the location of the touch. The details of the correlator unit is shown in FIG. 9. There are many different ways of doing correlation between the coefficients of the characterized signal and the real time signal. Here, couple different correlation techniques are discussed. FIG. 10 shows one approach to correlation. In FIG. 10, each coefficient matrix 55 at each stage applied to the adder unit 56. The adder 56 adds all the coefficients at a given stage. If all the coefficients are added then the sum 57 is applied to divider circuit 60 which divides the sum by the total number of coefficients at a given stage. The result 61 is the average for coefficients for a given stage. The output 61 is applied to the multiplier 65. The other input 62 of the multiplier 65 comes from the storage unit. The signal 62 is the average of coefficients at a given stage for characterized signal. The output 63 is the result of the multiplication of the signal 61 by the signal 62. The output signal 63 is applied to cross correlation eliminator 66 which eliminates candidate points based on the multiplication results. If five level decomposition is used, the correlation eliminator will check all the multiplication results for all levels. Then if there are many negative results of the multiplication, these points are eliminated from the candidate list. The output 67 of the correlation eliminator is applied to candidate locations unit 68 which keeps the list of candidate locations. The output 68 of the candidate locations unit is applied to the comparator unit 70 which compares each average correlation number between candidate locations and finds the most likely location. The output 71 of the comparator 70 is the touch location reported by the correlator. If there is no close correlation as a result of the correlator unit calculations then no location is reported for that touch as it might be a noise signal. FIG. 10 shows the second correlator unit that is used to compliment the first unit. The input 75 are the coefficients for a given stage. These coefficients 75 are applied to the adder unit 76 which adds all these coefficients together. The result 77 is applied to the divider unit 78 which divides the sum 77 of all the coefficients 75 by the total number of coefficients for the given stage. The output 79 of the divide unit 78 is applied to the subtractor unit 80. The other input 81 of the subtractor unit 80 is the coefficients of the characterizing signal. The subtractor unit 80 finds the difference between the coefficients 79 of the real time signal and the coefficients 81 of the characterization signal. The result 82 of the subtractor unit 80 is applied to the small number detector unit 83 which finds the smaller coefficient number and uses it to correlate. This is performed for each stage for both the approximation and the detail coefficients. As a result, the location with the most numbers that are smaller than others is considered to be the touch location. A variation of the correlator units discussed in FIG. 9 and FIG. 10 is a unit where all the coefficients of a real time signal at a given stage is correlated to the coefficients of a characterized signal. This is a longer process however can yield a better result. A search algorithm can be used to increase the speed of the correlation process. Furthermore, an interpolation algorithm can be used to reduce the number of points that are stored in the storage unit. In that case, less number of points are used to characterize the screen and the interpolation algorithm is used to determine the touch position during the real time touch operation.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A touch detection device comprising:
   a substrate for providing a base for the device;
   plurality of sensors for detecting acoustic waves and converting acoustic energy to electrical energy;
   an analog to digital converter for converting analog signal of the electrical energy to digital signal characterized in that a controller for processing the digital signal and for detecting a touch position and communicating to a host computer;
   a memory to store a reference wavelet coefficients;
   an algorithm means for calculating wavelet coefficients for the digital signal and interpolating those coefficients so that only certain number of coefficients used and comparing correlating part of those calculated wavelet coefficients with the reference wavelet coefficients stored in the memory to determine the touch location;
   wherein said means for calculating wavelet coefficients to determine the touch location is selected from the group consisting of a wavelet algorithm that uses a multilevel discrete wavelet transform and a wavelet algorithm that uses continues wavelet transform.

2. A system in accordance with claim 1, wherein said means for calculating wavelet coefficients to determine the touch location comprises an algorithm that calculates wavelet coefficients of the current signal and interpolates these coefficients and correlates those calculated coefficients with those stored coefficients for finding the touch location.

3. A touch detection device comprising:
   a substrate for providing a base for the device;
   plurality of sensors for detecting acoustic waves and converting acoustic energy to electrical energy;
   an analog to digital converter for converting analog signal of the electrical energy to digital signal;
   a controller for processing the digital signal and for detecting a touch position and communicating to a host computer;
   a memory for storing "n" reference wavelet coefficients;
   an algorithm for calculating wavelet coefficients for the digital signal and selecting first "n" wavelet coefficients to reduce the storage requirement of the system and comparing those first "n" wavelet coefficients with "n" reference wavelet coefficients stored in the memory to determine the touch location;
   wherein first "n" wavelet coefficients are determined based on error calculations and predictions;
   where "n" is 8, 16, 32, 64 or higher;
   wherein the algorithm is implemented as a firmware which is executed by the microcontroller on the controller.

4. The touch detection device in accordance with claim 3 where the algorithm is implemented in software that is executed on a host computer.

5. A method to determining a touch location in a touch detection device comprising steps of:
   reading the input digital signal;
   using a multilevel discrete wavelet transform or continues wavelet transform based on error calculations and predictions; to determine wavelet coefficients of the input signal;
   selecting the first "n" elements of wavelet coefficients based on a reduction of error calculations;
   comparing the first "n" elements of the wavelet coefficients of the input signal with reference wavelet coefficients of the signal in a memory unit;
   determining the touch location based on the correlation between the wavelet coefficients of the input signal and the reference wavelet coefficients in the memory unit;
   wherein only first "n" elements of the wavelet coefficients are used to reduce the storage requirement;
   wherein "n" is 8, 16, 32, 64 or higher; and
   wherein a reference signal itself is stored in the storage unit for future correlation and the wavelet coefficients of the reference signal are calculated and stored in the memory unit for future correlation.

6. A touch detection system comprising:
   a controller;
   a storage element for storing reference wavelet coefficients;
   an algorithm that uses wavelet transform to find a touch location;
   wherein said controller comprises a sensor to sense the signal strength for determining the touch screen size;
   wherein said controller further comprises a circuit where its gain is automatically controlled based on the touch screen size;
   wherein said algorithm calculates wavelet coefficients of the current input signal and interpolates these coefficients and correlates the calculated coefficients with the wavelet coefficient in the storage element, the algorithm using interpolation to reduce the number of coefficients required to calculate the touch location;
   wherein said algorithm uses multilevel discrete wavelet transform or continues wavelet transform to determine the touch location based on error calculations and predictions.

7. A method for a touch detection system comprising an algorithm including the steps of:
   calculating coefficients of the signal generated by a touch during characterization using multilevel discrete wavelet transform or continues wavelet transform based on error calculations and predictions;
   storing said coefficients in a storage element;
   calculating new wavelet coefficients of the signal generated during user interface;
   correlating said new coefficients and the coefficients stored in the said storage element by finding the difference between the coefficients calculated based on the real time touch and coefficients stored in the memory;
   adding said differences to find a total of differences;
   comparing said differences;
   determining the touch location based on the results of the said correlation to reduce the error calculations and predictions.

* * * * *